(12) United States Patent
Hillman

(10) Patent No.: US 7,475,326 B2
(45) Date of Patent: Jan. 6, 2009

(54) ERROR DETECTION AND CORRECTION METHOD AND SYSTEM FOR MEMORY DEVICES

(75) Inventor: Robert Hillman, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 600 days.

(21) Appl. No.: 10/861,667

(22) Filed: Jun. 4, 2004

(65) Prior Publication Data

US 2006/0150063 A1 Jul. 6, 2006

Related U.S. Application Data

(60) Provisional application No. 60/483,210, filed on Jun. 27, 2003.

(51) Int. Cl.
*G11C 29/00* (2006.01)

(52) U.S. Cl. ....................................................... 714/767

(58) Field of Classification Search ................ 714/763, 714/767, 773
See application file for complete search history.

(56) References Cited

U.S. PATENT DOCUMENTS

| | | | |
|---|---|---|---|
| 5,463,644 A * | 10/1995 | Rodi et al. ................. 714/766 |
| 5,635,754 A | 6/1997 | Strobel |
| 5,754,563 A | 5/1998 | White |
| 5,825,042 A | 10/1998 | Strobel |
| 5,889,316 A | 3/1999 | Strobel |
| 5,987,627 A * | 11/1999 | Rawlings, III ............... 714/48 |
| 6,092,231 A * | 7/2000 | Sze .......................... 714/758 |
| 6,262,362 B1 | 7/2001 | Czjakowski |
| 6,473,880 B1 * | 10/2002 | Cypher ....................... 714/800 |
| 6,691,276 B2 * | 2/2004 | Holman ...................... 714/767 |
| 6,973,613 B2 * | 12/2005 | Cypher ....................... 714/773 |

* cited by examiner

*Primary Examiner*—Shelly A Chase
(74) *Attorney, Agent, or Firm*—Hensley Kim & Holzer, LLC

(57) ABSTRACT

A method and a system for the detection and correction of errors in memory systems is disclosed. In one embodiment, a method of error detection in a memory system having a plurality (m>1) of memory devices includes generating check bits for each of a plurality of data sets, dividing each memory device into a plurality (n>1) of segments. The plurality of data sets are interleaved to form a plurality (p>1) of words. Each word includes at least one segment from two or more of the memory devices. Detection and correction may utilize oneor more parallel Reed-Solomon decoder and encoder. The system and method allow for the efficient detection and/or correction of memory device errors and bit errors in one or more memory devices.

22 Claims, 7 Drawing Sheets

ERROR DETECTION AND CORRECTION METHOD AND SYSTEM FOR MEMORY DEVICES

This application is related to commonly assigned U.S. Provisional Patent Application No. 60/483,210, filed 27 Jun. 2003, from which priority is claimed, and which is hereby incorporated by reference in its entirety, including all tables, figures, and claims.

FIELD OF THE INVENTION

The present invention relates generally to computer systems. More particularly, the invention relates to error detection and correction for memory devices.

BACKGROUND

The following description is provided to assist the understanding of the reader. None of the information provided or references cited is admitted to be prior art to the present invention.

Memories for computers and other devices can often contain errors that may result from many sources. For example, a bit error in a memory may result from a strike by a radiation particle in an outer space environment. In other cases, permanent errors in the device may accumulate over time, resulting in potentially catastrophic errors in the memory device.

Several known methods exist for detecting and/or correcting such errors in memory devices. For example, Reed-Solomon algorithms have been implemented in memory devices for many years. Such algorithms generally utilize an error code, or check bits, associated with data to detect and correct an error in the memory. Reed-Solomon algorithms generally function in a block fashion in which a code word is capable of detecting or correcting errors in one or more bytes of the data. For example, FIG. 1 illustrates a 32-bit data field 102 and a corresponding 16-bit check bits 104. The 32-bit data field 102 is equivalent to four 8-bit bytes, and the check bits 104 are equivalent to two 8-bit bytes. In this configuration, a Reed-Solomon algorithm is capable of correcting an error in a single 8-bit block size. In other words, the number of erroneous blocks that can be detected and corrected is one-half the number of blocks in the check bits.

However, in certain environments, it is possible for an entire device to become affected by an event, or the entire device may become defective due to accumulated permanent bit errors. In this case, the check bits in each individual device are insufficient to detect and correct multiple device errors. One solution to this problem is to increase the number of bits in the check bits, but this significantly increases the overhead, which may be defined as the number of check bits divided by the number of data bits.

It is desirable to achieve a method or a system to correct device errors and bit errors in two or more devices without increasing the overhead.

SUMMARY OF THE INVENTION

The invention described herein relates to robust memory devices for use in, for example, computers. The invention relates to a memory device which include error detection and correction logic. Such logic is capable of detecting and correcting an increased number and type of errors when compared to other known methods without increasing the cost, as may be defined by overhead.

In one aspect, the invention provides a method of error detection in a memory system having a plurality (m>1) of memory devices. The method includes generating check bits for each of a plurality of data sets, dividing each memory device into a plurality (n>1) of segments. The plurality of data sets are interleaved to form a plurality (p>1) of words. Each word includes at least one segment from two or more of the memory devices.

In another aspect, the invention provides a memory system having a plurality (m>1) of memory devices. Each device is divided into a plurality (n>1) of segments. At least one error encoder is provided and is adapted to generate check bits for a plurality of data sets. The system also includes an interleaving module adapted to interleave the plurality of data sets to form a plurality (p>1) words. Each word includes at least one segment from two or more of the memory devices.

In one embodiment, a method of error detection in a memory having m memory devices, each memory device having a single bit per storage cell, comprises: generating corrected data for each of a plurality of data sets; dividing each of m memory devices into n segments, wherein m and n are greater than one; and interleaving the plurality of data sets to form p words, each word including at least one segment from two or more of said memory devices. The step of generating corrected data may include transmitting the data sets to one or more encoder. The step of generating corrected data may include transmitting each of said data sets to one or more decoder. The data sets may be read in parallel. The encoder and said decoder may comprise a Reed-Solomon algorithm. In one embodiment, m=8. In one embodiment, n=2. In one embodiment, p=2. In one embodiment, p>2.

In one embodiment, a memory system comprises: m memory devices, each device being divided into n segments, wherein m and n are greater than one, each memory device adapted to include a single bit per storage cell; at least one encoder adapted to generate check bits for a plurality of data; and an interleaving module adapted to interleave the plurality of data to form p words, each word including at least one segment from two or more of said memory devices. Each encoder may be adapted to generate check bits for different data. The system may further comprise at least one decoder for receiving de-interleaved data from the interleaving module and for providing the data as corrected data. Each encoder may be a Reed-Solomon encoder. Each decoder may be a Reed-Solomon decoder. In one embodiment, m=8. In one embodiment, n=2. In one embodiment, p=2. In one embodiment, p>2. The system may further comprise a radiation-mitigating shield adapted to shield components of said memory system.

In one embodiment, a memory error detection and correction system includes: memory means for storing data; error detection means for detecting errors in the stored data; and error correction means for correcting the errors in the stored data.

While advantages, benefits, and embodiments of the present invention are described herein, it would be understood that such descriptions are exemplary of uses and aspects of the presently described error detection and correction systems and methods and should not be limiting in content.

DETAILED DESCRIPTION

The present invention is generally directed to memory devices adapted to detect and correct errors and to error detection and correction systems and methods. In this regard, the present invention allows the detection and correction of an increased number and type of errors.

The disclosed implementation of memories provide robustness in their ability to detect and correct memory device errors and bit errors in individual memory devices. While prior memory devices have employed error detection and correction capable of correcting bit errors, adapting those implementations to detect either bit errors or device errors results in a substantial increase in overhead (i.e., the number of bits required in the check bits). The present invention provides the ability to do so without substantial increased overhead.

Figure 1:
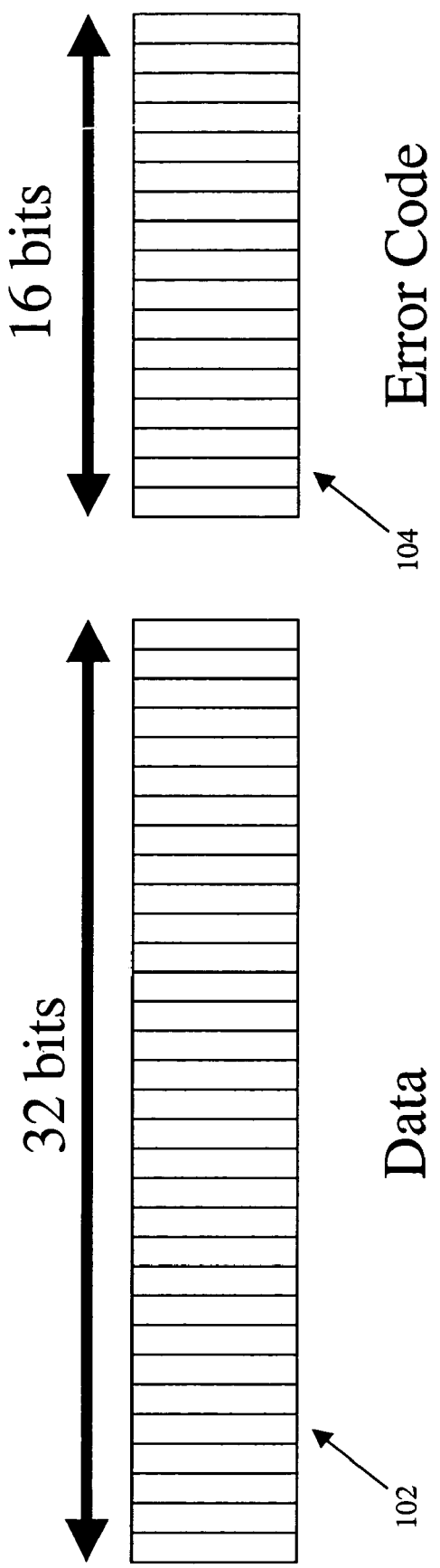
FIG. 1 is a schematic illustration of a prior-art memory element.
Figure 2:
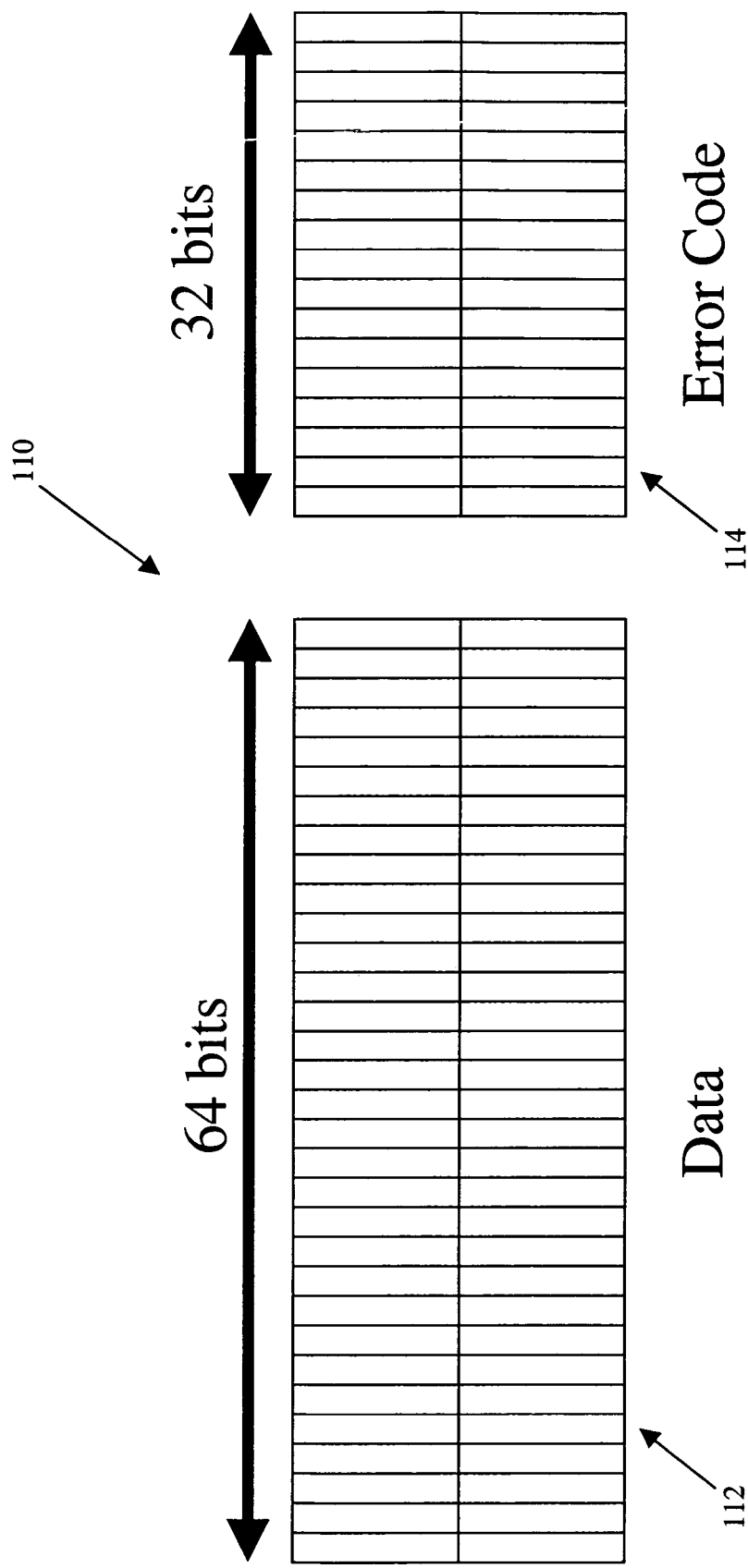
FIG. 2 is a schematic illustration of one embodiment of a memory system according to the present invention.

FIG. 2 illustrates one embodiment of a memory system according to the present invention. An exemplary memory system 110 may be provided with a large data storage 112 and a check-bit storage 114. The memory system may be implemented as any of a number of memory types, including random access memory (RAM), synchronous dynamic random access memory (SDRAM) or flash memory, for example, which include a single bit per storage cell.

For illustration purposes, the embodiment illustrated in FIG. 2 includes a data storage 112 of 64 bits and a check-bit storage 114 of 32 bits. Those skilled in the art will recognize that the size of the data storage and the check-bit storage may be varied to suit a particular need. As discussed in greater detail below, the size of check-bit storage is a large factor in the number of errors that can be detected and/or corrected.

Figure 3:
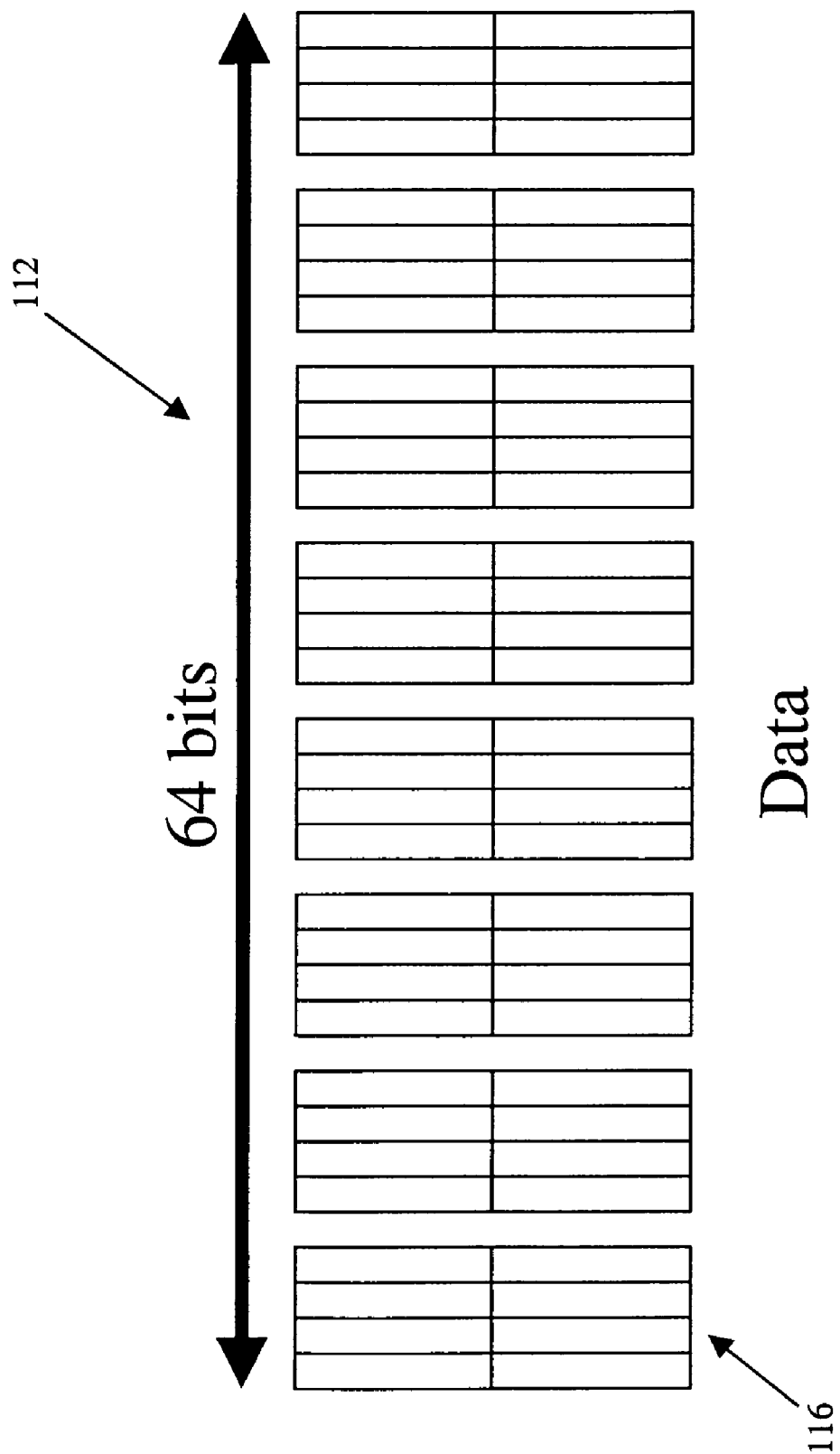
FIG. 3 is a schematic illustration of the data portion of the memory system illustrated in FIG. 2.

According to an embodiment of the present invention, the data storage 112 can be partitioned into two or more memory devices 116, as illustrated in FIG. 3. In this embodiment, the 64-bit data storage is partitioned into eight 8-bit devices. In other embodiments, the data storage may be partitioned into any number (m) of memory devices. Alternatively, any number (m) of memory devices may be separately provided to form the configuration illustrated in FIG. 3.

Figure 4:
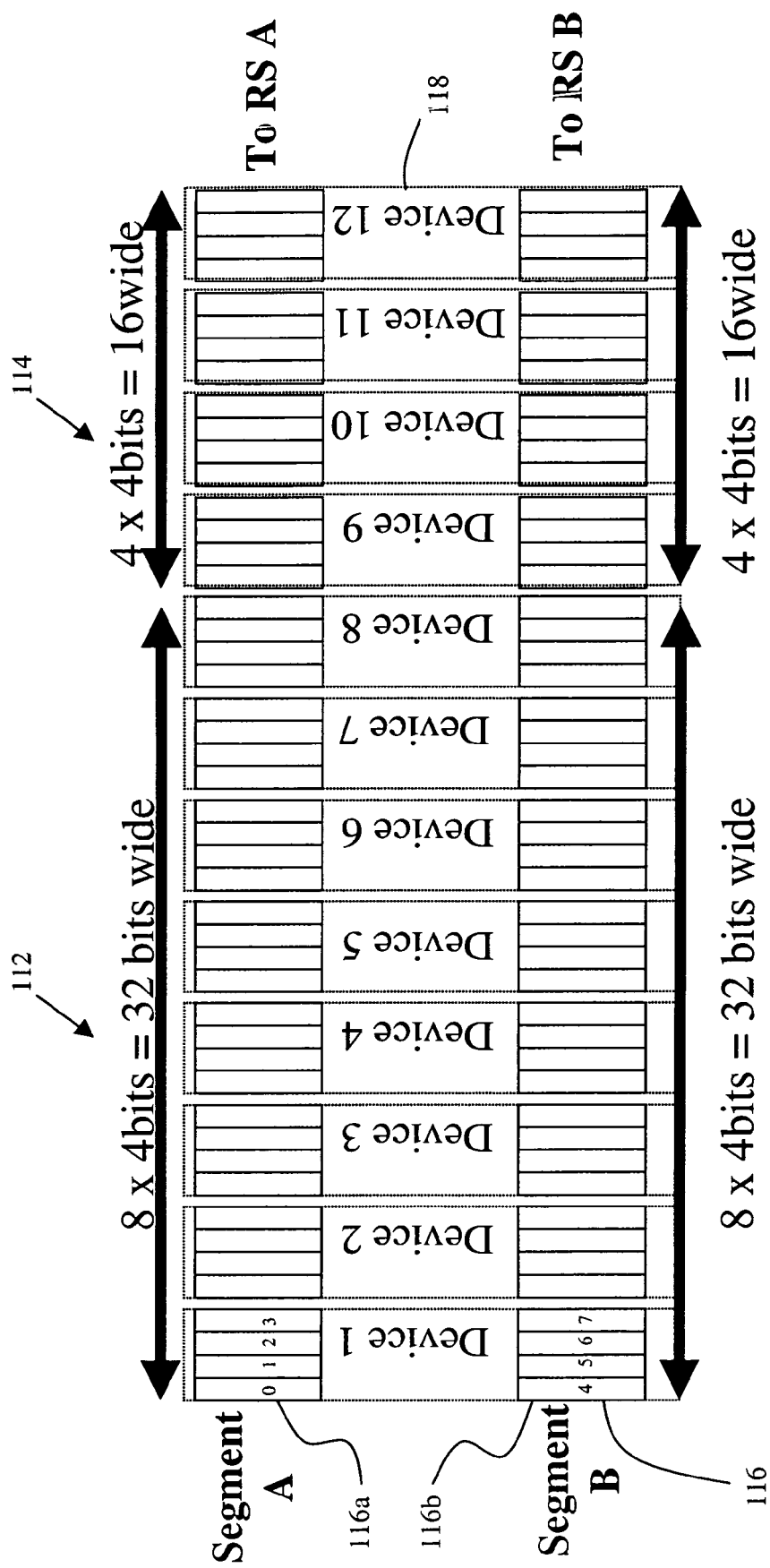
FIG. 4 is a schematic illustration of the partitioning of the memory system illustrated in FIG. 2.

FIG. 4 illustrates the memory system 110 of FIG. 2 with the partitioning described above with reference to FIG. 3. As noted in the illustrated preferred embodiment, the check-bit storage 114 is similarly partitioned into a plurality of devices, labeled Device 9 through Device 12 118. Each device, whether a data storage device (Devices 1-8) or a check-bit storage device (Devices 9-12), is an 8-bit device.

Each device 116, 118 is divided into a plurality (n) of segments. In the embodiment illustrated in FIG. 4, each device 116, 118 is divided into two 4-bit segments (n=2). For example, Device 1 116 is divided into two 4-bit segments 116a, 116b, labeled Segment A and Segment B. Segment A 116a includes bits 0, 1, 2 and 3 of the 8-bit device 116, while Segment B 116b includes bits 4, 5, 6 and 7. All devices are similarly divided into two segments corresponding to Segment A and Segment B. Thus, if a byte in the memory system includes 8-bits, each device 116 represents a byte, while each segment 116a, 116b represents a nibble (one half of a byte).

An error detection and correction algorithm may be implemented to form a check bits for storage in segments from various devices. Further, the data corresponding to the check bits is also stored in various devices. For example, data may be divided for storage in one segment from each device, thereby producing a plurality (p) of words. In the embodiment illustrated in FIG. 4, for example, one word may be formed by combining a first nibble ("Segment A") from each data device (Devices 1-8), and a second word may be formed by similarly combining a second nibble ("Segment B") from each data device. Thus, two 32-bit (8-nibble) words are formed.

The length of the check bits may be designed for a particular error-detection level. For example, in the illustrated example, if an error-detection level of two nibbles is desired, the check bits length is set at four nibbles, or 16 bits.

The generation of the check bits may be performed using a variety of known methods. One such method is described in U.S. Pat. No. 5,754,563, which is hereby incorporated by reference in its entirety. The check bits are generally a function of the values in the corresponding data fields. In this case, the check bits are a function of the word, which contains segments from two or more memory devices. If the data field is corrupted with a bit error, for example, the error detection algorithm recognizes an error has occurred by "re-calculating" the check bits and noting a mismatch between the received check bits and the re-calculated check bits. Similar techniques may be used to determine which bit is erroneous.

Figure 7:
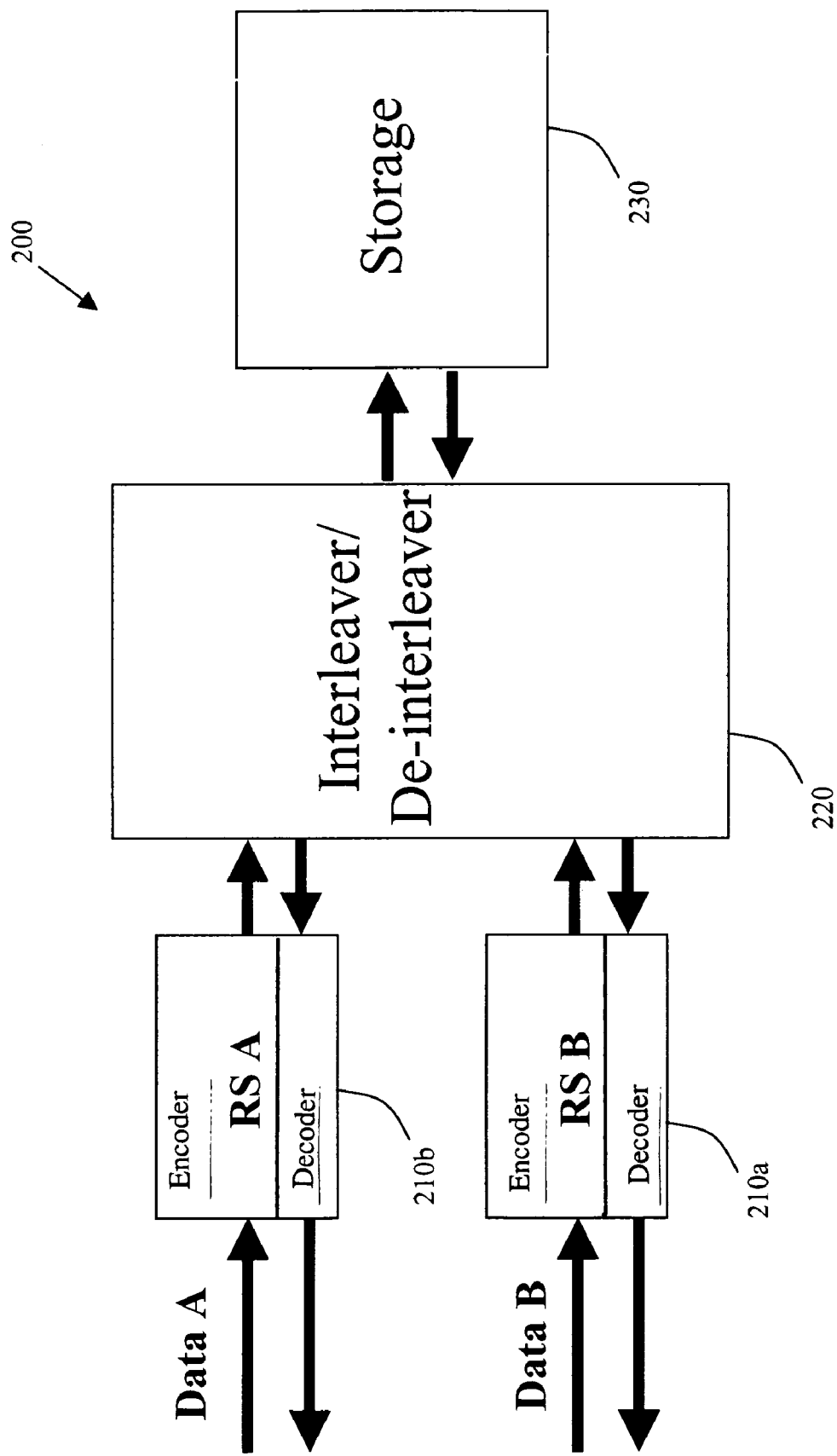
FIG. 7 is a schematic illustration of an embodiment of a system for encoding, interleaving, ad decoding.

The generation and storage of the check bits will now be described with reference to FIG. 7. FIG. 7 illustrates an embodiment of a system for encoding, decoding, interleaving and decoding data. In one embodiment, system 200 a plurality of error detection and correction blocks 210a, 210b. In one embodiment, blocks 210a, 210b implement a Reed-Solomon error detection and correction scheme. Reed-Solomon error detection and correction algorithms, as well as various hardware, software, and firmware implementations are well known to those skilled in the art. More preferably, a parallel Reed-Solomon algorithm is utilized. One such parallel Reed-Solomon algorithm is described in U.S. Pat. No. 5,754,563, which is hereby incorporated by reference in its entirety.

In one embodiment, each word is transmitted to block 210a and block 210b. In this regard, each block 210a and 210b comprises an encoder that is associated with a different word. Each encoder receives data and generates check bits corresponding to that data. The data and the check bits are transmitted in parallel to an interleaving module 220. The interleaving module 220 interleaves the check bits and data bits and stores the data and the check bits in a storage device 230, which may include a plurality of memory devices similar to those described above with reference to FIG. 4.

When the data is to be retrieved, the data is accessed by the interleaving module 220, and the interleaved information, including the check bits, are de-interleaved. The de-interleaving function and the interleaving function may be performed by separate modules or by the same module, as illustrated in FIG. 7. The de-interleaved check bits and the data then transmitted to corresponding decoders of blocks 210a, 210b for decoding of the check bits. Thus, data from an external source may be received by blocks 210a, 210b, which generate check bits for each set of data and determine corrected data. The check bits are generated according to the system described above. In implementing connections between various elements described herein, it is understood that such connections could be effectuated utilizing techniques known to those skilled in the art, for example, multiplexing, de-multiplexing, etc.

Figure 5:
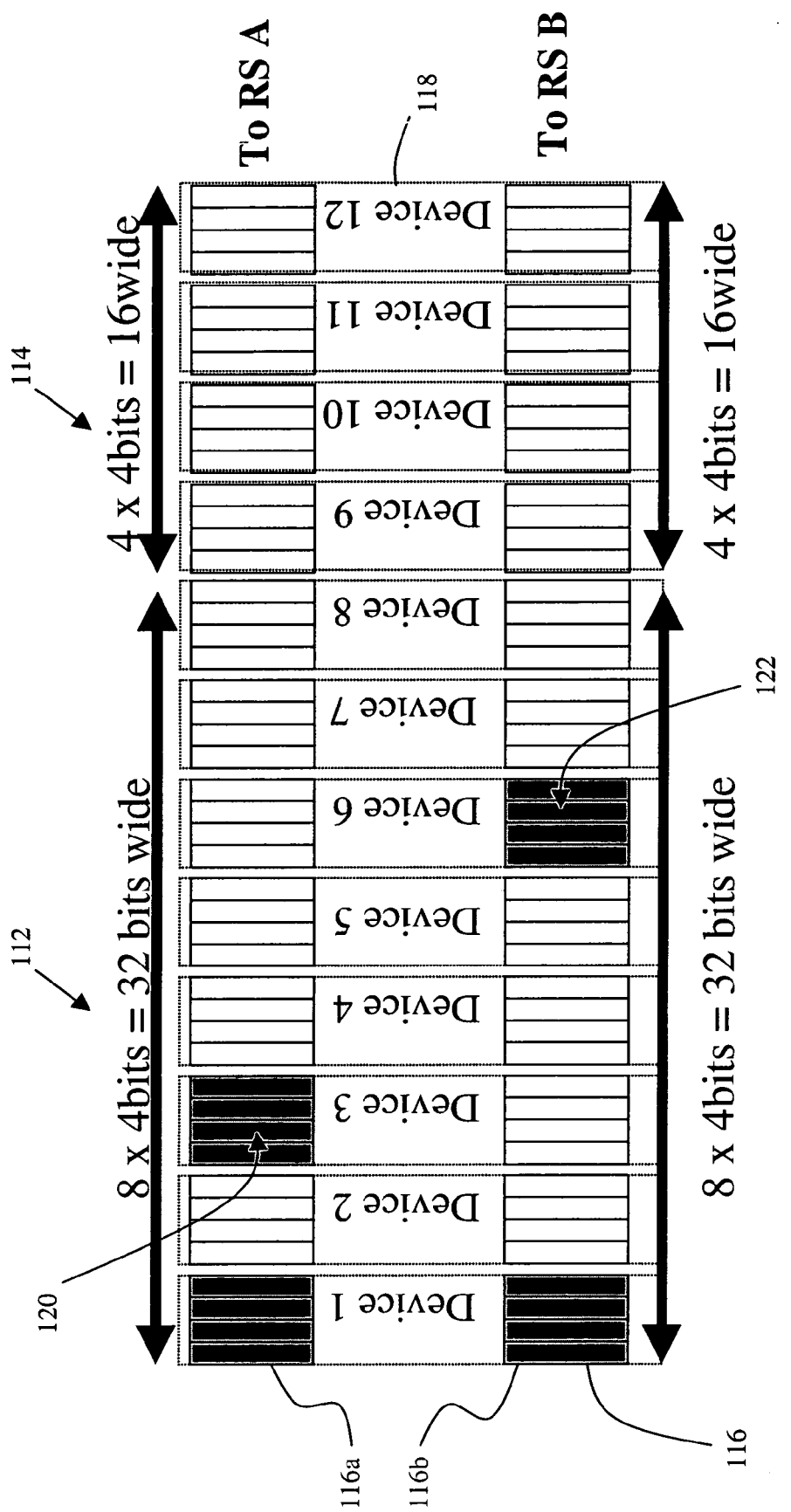
FIG. 5 is a schematic illustration showing an example of errors that may be detected and corrected in an embodiment of the present invention.

The advantages of the disclosed embodiments of the present invention are illustrated in FIG. 5. In a standard 64-bit data, 32-bit check-bit memory system, a Reed-Solomon algorithm is capable of detecting and correcting errors in two bytes. In other words, the two errors are located in two devices. As illustrated in FIG. 5, the disclosed embodiment is capable of detecting and correcting errors in two nibbles of each word. The nibbles in one word can, but need not, correspond to the nibbles in another word. For example, FIG. 5 illustrates a device error in Device 1 and bit errors in one nibble of Device 3 and in one nibble of Device 6. The first word (top row) contains two nibble errors (Device 1 and Device 3), and the second word (bottom row) also contains two nibble errors (Device 1 and Device 6). Each 16-bit check-bit block is able to provide detection and correction capability for the illustrated errors. Thus, the disclosed embodiments result in greater protection by providing error detection and correction ability for an increased number of devices.

Although the above-described embodiments illustrate an example in which the number of segments equals the number of words formed, other examples may be illustrated in which the two are unequal. Further, the above-described embodiments illustrate an example in which each word includes one segment from each device. In other embodiments, however, certain words may have more than one segment from certain devices and/or no segments from other devices. One example of these embodiments is illustrated in FIG. 6.

Figure 6:
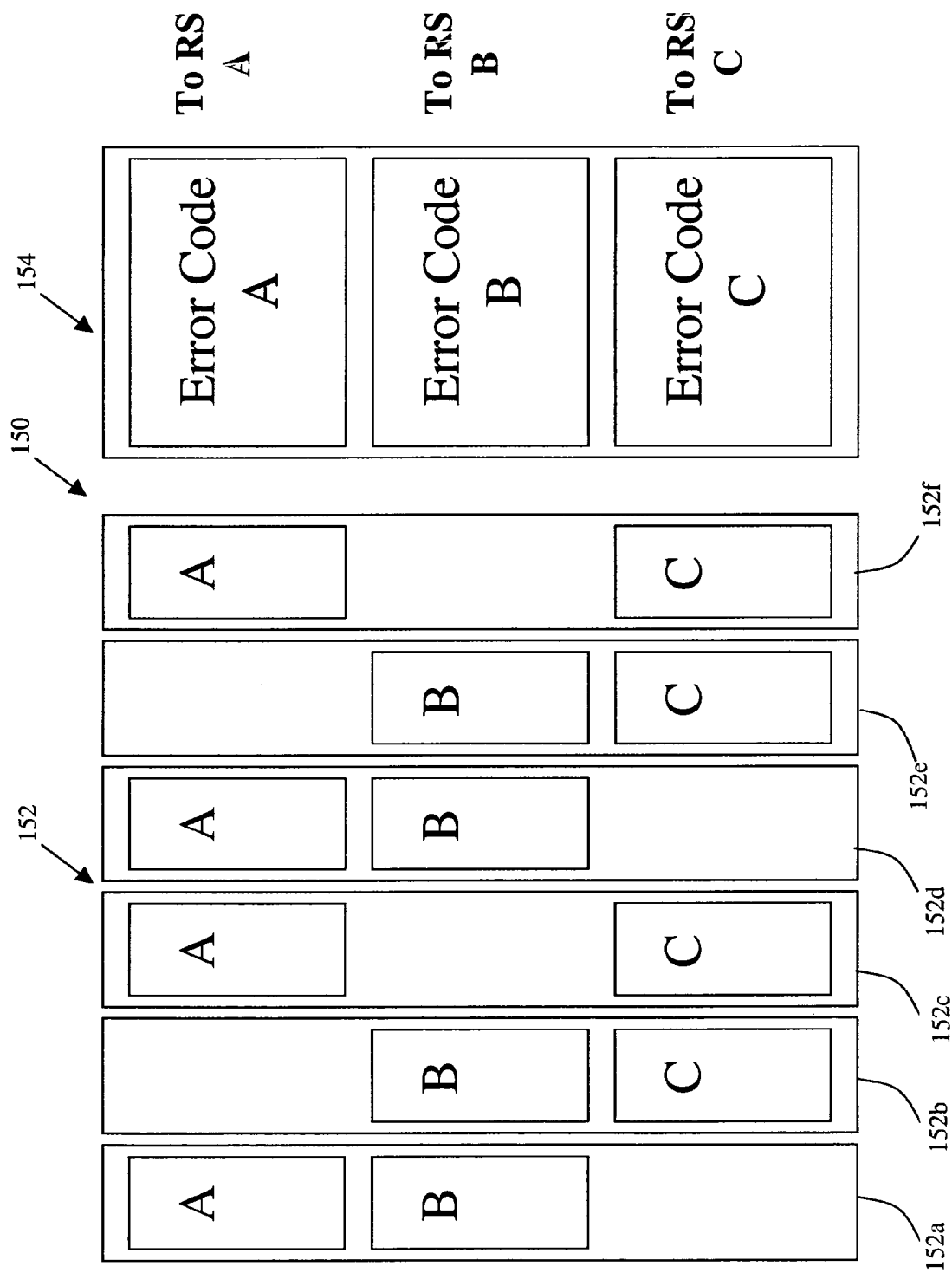
FIG. 6 is a schematic illustration of another embodiment of the present invention.

As illustrated in FIG. 6, a memory system 150 includes a data storage 152 and a check-bit storage 154. The data storage 152 is divided into six devices 152a-f, each of which is divided into two segments. However, the two segments of each device may correspond to two of three word labels, A. B or C. Thus, the two segments of the first device 152a correspond to labels A and B, the two segments of the second device 152b correspond to B and C, and the two segments of the third device 152c correspond to A and C. The labeling cycle is repeated for the remaining three devices 152d, 152e, 152f. Thus, a first word is formed using segments corresponding to the word label A and includes segments from the four devices 152a, 152c, 152d, 152f. Similarly, words are formed using segments corresponding to the word labels B and C. Thus, each word includes a segment from each of four devices. Therefore, in this example, the number of devices is six (m=6), the number of segments is two (n=2), and the number of words is three (p=3). Check bits may be generated for each of the three words for transmission to a receiver, such as a decoder of a Reed-Solomon block.

It is noted that more than a single segment from each device may also be used for each word. As an example, one may consider each segment label A, B or C of each device as being illustrative of two segments. Thus, the first device 152a may be divided into four segments, two A and two B. Other devices may be similarly divided. Thus, each word contains two segments from each of four devices.

The memory systems described above may be implemented as memory modules. Each module may be provided with a radiation-mitigating shield, which is a mechanical shield adapted to shield a component or a set of components from a radiation-affected environment. "Mechanical shielding," as used herein, refers to a physical structure intended to shield a component, such as a processor or a memory module, from a potentially harmful environment. For examples of such shielding, reference may be made to U.S. Pat. Nos. 5,635,754, 5,825,042, 5,889,316, and 6,262,362, each of which is incorporated herein by reference in its entirety.

While preferred embodiments and methods have been shown and described, it will be apparent to one of ordinary skill in the art that numerous alterations may be made without departing from the spirit or scope of the invention. Therefore, the invention is not limited except in accordance with the following claims or their equivalents.

We claim:

1. A memory system, comprising:
    m memory devices, each device being divided into n segments, wherein m and n are greater than one, each memory device adapted to include a single bit per storage cell;
    at least one encoder adapted to generate check bits for a plurality of data; and
    an interleaving module adapted to interleave the plurality of data to form p words, each word including at least one segment from two or more of said memory devices,
    wherein the at least one encoder is a parallel Reed-Solomon encoder.

2. The system according to claim 1, wherein the at least one encoder is adapted to generate check bits for different data.

3. A memory system, comprising:
    m memory devices, each device being divided into n segments, wherein m and n are greater than one, each memory device adapted to include a single bit per storage cell;
    at least one encoder adapted to generate check bits for a plurality of data, wherein the at least one encoder is adapted to generate check bits for different data;
    an interleaving module adapted to interleave the plurality of data to form p words, each word including at least one segment from two or more of said memory devices; and
    at least one decoder receiving de-interleaved data from the interleaving module and providing the data as corrected data.

4. The system according to claim 3, wherein the at least one decoder is a parallel Reed-Solomon decoder.

5. The system according to claim 1, wherein m=8.

6. The system according to claim 1, wherein n=2.

7. The system according to claim 6, wherein p=2.

8. The system according to claim 6, wherein p>2.

9. A memory system, comprising:
    m memory devices, each device being divided into n segments, wherein m and n are greater than one, each memory device adapted to include a single bit per storage cell;
    at least one encoder adapted to generate check bits for a plurality of data;
    an interleaving module adapted to interleave the plurality of data to form p words, each word including at least one segment from two or more of said memory devices; and
    a radiation-mitigating shield adapted to shield components of said memory system.

10. The system according to claim 9, wherein the at least one encoder is adapted to generate check bits for different data.

11. The system according to claim 9, wherein m=8.

12. The system according to claim 9, wherein n=2.

13. The system according to claim 12, wherein p=2.

14. The system according to claim 12, wherein p>2.

15. The system according to claim 1, further comprising at least one decoder receiving de-interleaved data from the interleaving module and providing the data as corrected data.

16. The system according to claim 15, wherein the at least one decoder is a parallel Reed-Solomon decoder.

17. The system according to claim 1, further comprising a radiation-mitigating shield adapted to shield components of said memory system.

18. The system according to claim 3, wherein m=8.

19. The system according to claim 3, wherein n=2.

20. The system according to claim 19, wherein p=2.

21. The system according to claim 19, wherein p>2.

22. The system according to claim 3, further comprising a radiation-mitigating shield adapted to shield components of said memory system.

* * * * *